United States Patent
Hsieh

(10) Patent No.: US 7,337,498 B2
(45) Date of Patent: Mar. 4, 2008

(54) ELECTRONIC DEVICE AND HINGE ASSEMBLY THEREOF

(75) Inventor: Yung-Tsun Hsieh, Changhua (TW)

(73) Assignee: BENQ Corporation, Taoyuan (TW)

( * ) Notice: Subject to any disclaimer, the term of this patent is extended or adjusted under 35 U.S.C. 154(b) by 0 days.

(21) Appl. No.: 11/282,578

(22) Filed: Nov. 18, 2005

(65) Prior Publication Data

US 2006/0075603 A1    Apr. 13, 2006

Related U.S. Application Data

(62) Division of application No. 10/796,633, filed on Mar. 9, 2004.

(30) Foreign Application Priority Data

Mar. 11, 2003   (TW) .............................. 92203676 U

(51) Int. Cl.
*E05D 11/10* (2006.01)
(52) U.S. Cl. .......................................... 16/330; 16/327
(58) Field of Classification Search ................. 16/330, 16/303, 331, 332, 327, 328, 298, 301
See application file for complete search history.

(56) References Cited

U.S. PATENT DOCUMENTS

| | | | |
|---|---|---|---|
| 5,606,773 A * | 3/1997 | Shappell ....................... 16/298 |
| 6,665,906 B2 * | 12/2003 | Li ................................. 16/330 |
| 6,886,221 B2 * | 5/2005 | Minami et al. ................ 16/324 |
| 6,948,217 B2 * | 9/2005 | Higano et al. ................. 16/303 |
| 7,006,853 B2 * | 2/2006 | Kang et al. .............. 455/575.3 |
| 2001/0016474 A1 * | 8/2001 | Nagashima .................. 455/90 |
| 2001/0019946 A1 * | 9/2001 | Okuda .......................... 455/90 |
| 2001/0036265 A1 * | 11/2001 | Oh ........................ 379/433.01 |

* cited by examiner

*Primary Examiner*—Robert J. Sandy
(74) *Attorney, Agent, or Firm*—Quintero Law Office

(57) ABSTRACT

An electronic device and a hinge assembly thereof. The electronic device includes a base, an elastic member, a first cam, a second cam, and a third cam. The elastic member is disposed on the base. The first cam is disposed on the base in a manner such that the first cam is abutted by the elastic member. The first cam rotates in a first direction and a second direction opposite to the first direction. The second cam is disposed on the base in a manner such that the second cam is abutted by the first cam. When the first cam rotates in the first direction, the second cam rotates along with the first cam. The third cam is disposed on the base in a manner such that the third cam is abutted by the second cam. When the first cam rotates in the second direction, the second cam is blocked by the third cam and does not rotate along with the first cam.

15 Claims, 14 Drawing Sheets

ELECTRONIC DEVICE AND HINGE ASSEMBLY THEREOF

This application is a divisional of U.S. application Ser. No. 10/796,633, filed Mar. 9, 2004.

BACKGROUND OF THE INVENTION

1. Field of the Invention

The invention relates to an electronic device and a hinge assembly thereof; in particular, the invention relates to a hinge assembly that can make the operation of an electronic device more convenient.

2. Description of the Related Art

Conventional hand-held, clamshell type electronic devices are opened and closed by hinge torsion. A clamshell type mobile phone, for instance, comprises a housing with upper and lower portions joined by a hinge. The mobile phone may be manually opened to a predetermined angle, such as 30 degrees, relative to its closed state, by torsion acting on the hinge. The mobile phone may then be further opened automatically to a maximum open angle of 180 degrees relative to its closed state. Conversely, when the upper housing portion is manually returned to a 30-degree angle relative to its closed state, the upper housing is automatically closed to its closed state by torsion acting on the hinge.

The hinge is provided with a plurality of cams to obtain the above function and determine the feature of such a clamshell type device to be opened automatically at a certain angle. The device is automatically opened or closed when the angle of the upper housing portion on the hinge exceeds a critical torsion point. For example, when the cams are designed to manually open the device to a 30 degree angle; the upper housing portion of the device must then be automatically opened to the full open angle of 180 degrees. The device may also be automatically opened to the full open angle of 180 degrees after being manually opened to the initial 30 degree angle. To completely close the device from the full open angle of 180 degrees, however, the upper housing portion must be manually closed to an angle on the hinge of less than 30 degrees to automatically return the device to its original closed state. The manual action required to return the upper housing of the electronic device to the original closed state from the full open angle of 180 degrees could possibly be considered inconvenient, hence, a hinge assembly that simplifies the opening and closing action is called for.

SUMMARY OF THE INVENTION

In view of this, the invention provides an electronic device including a hinge assembly enabling the automatic opening and closing feature to be engaged from several positions, thus simplifying the action.

Specifically, in an electronic device as disclosed in the invention, when the auto-open feature in engaged at an angle of 30 degrees, the auto-close feature is engaged at an angle of 150 degrees. That is, after the upper housing portion is manually opened to an angle of more than 30 degrees, the upper housing portion can then be automatically opened to 180 degrees by the hinge. Similarly, when the upper housing portion is closed from 180 degrees, the upper housing portion is manually pushed to 150 degrees so that the upper housing portion can be completely closed automatically. Thus, the operation of the electronic device becomes convenient.

Accordingly, the invention provides an electronic device including a base, an elastic member, a first cam, a second cam, and a third cam. The elastic member is disposed on the base. The first cam is disposed on the base in a manner such that the first cam is abutted by the elastic member. The first cam is rotated in a first direction and a second direction opposite to the first direction. The second cam is disposed on the base in a manner such that the second cam is abutted by the first cam. When the first cam is rotated in the first direction, the second cam is rotated along with the first cam. The third cam is disposed on the base in a manner such that the third cam is abutted by the second cam. When the first cam is rotated in the second direction, the second cam is blocked by the third cam and is not rotated along with the first cam.

The present invention provides a hinge assembly including a base, an elastic member, a first cam, a second cam, and a third cam. The elastic member is disposed on the base. The first cam is disposed on the base in a manner such that the first cam is rotated in a first direction and a second direction opposite to the first direction. The second cam is disposed on the base in a manner such that the second cam is abutted by the first cam. When the first cam is rotated in the first direction, the second cam is rotated along with the first cam. The third cam is disposed on the base in a manner such that the third cam is abutted by the second cam and the elastic member. When the first cam is rotated in the second direction, the second cam is blocked by the third cam and is not rotated along with the first cam.

BRIEF DESCRIPTION OF THE DRAWINGS

The present invention can be more fully understood by reading the subsequent detailed description and examples with references made to the accompanying drawings, wherein:

FIG. 2b is a schematic view of the assembled hinge assembly in FIG. 2a;

FIG. 3a and FIG. 3b are schematic views of a first cam in FIG. 2a;

FIG. 3c and FIG. 3d are schematic views of a second cam in FIG. 2a;

FIG. 3e and FIG. 3f are schematic views of a third cam in FIG. 2a;

DETAILED DESCRIPTION OF THE INVENTION

EMBODIMENT 1

Figure 1A:
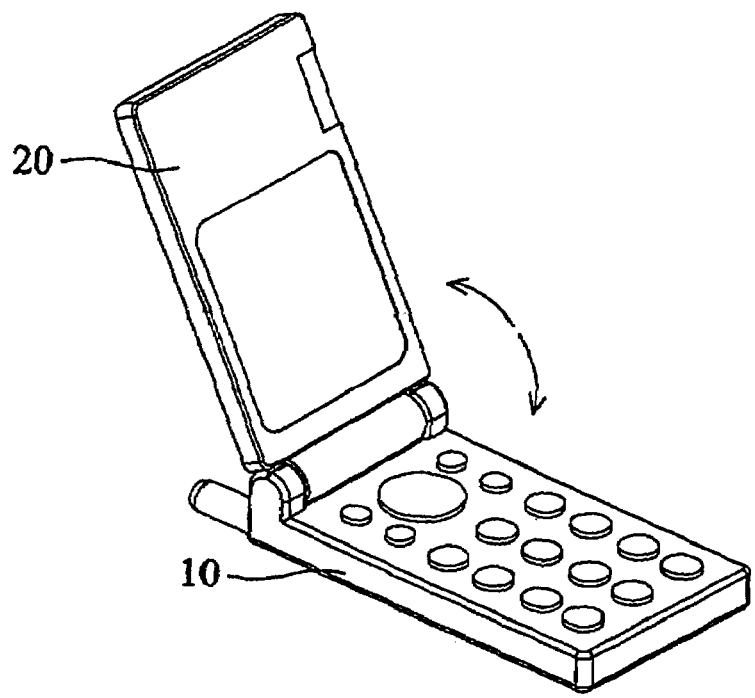
FIG. 1a is a schematic view of an electronic device as disclosed in a first embodiment of the invention.
Figure 1B:
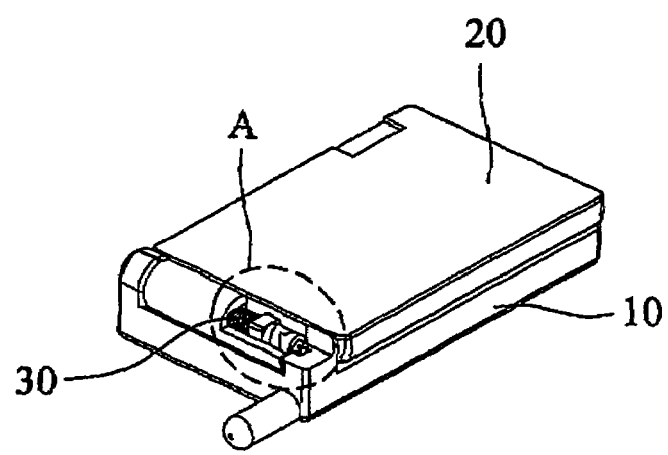
FIG. 1b is a schematic view of the electronic device as shown in FIG. 1a, in a closed state with a partial cut away view exposing a portion of the hinge assembly.
Figure 1C:
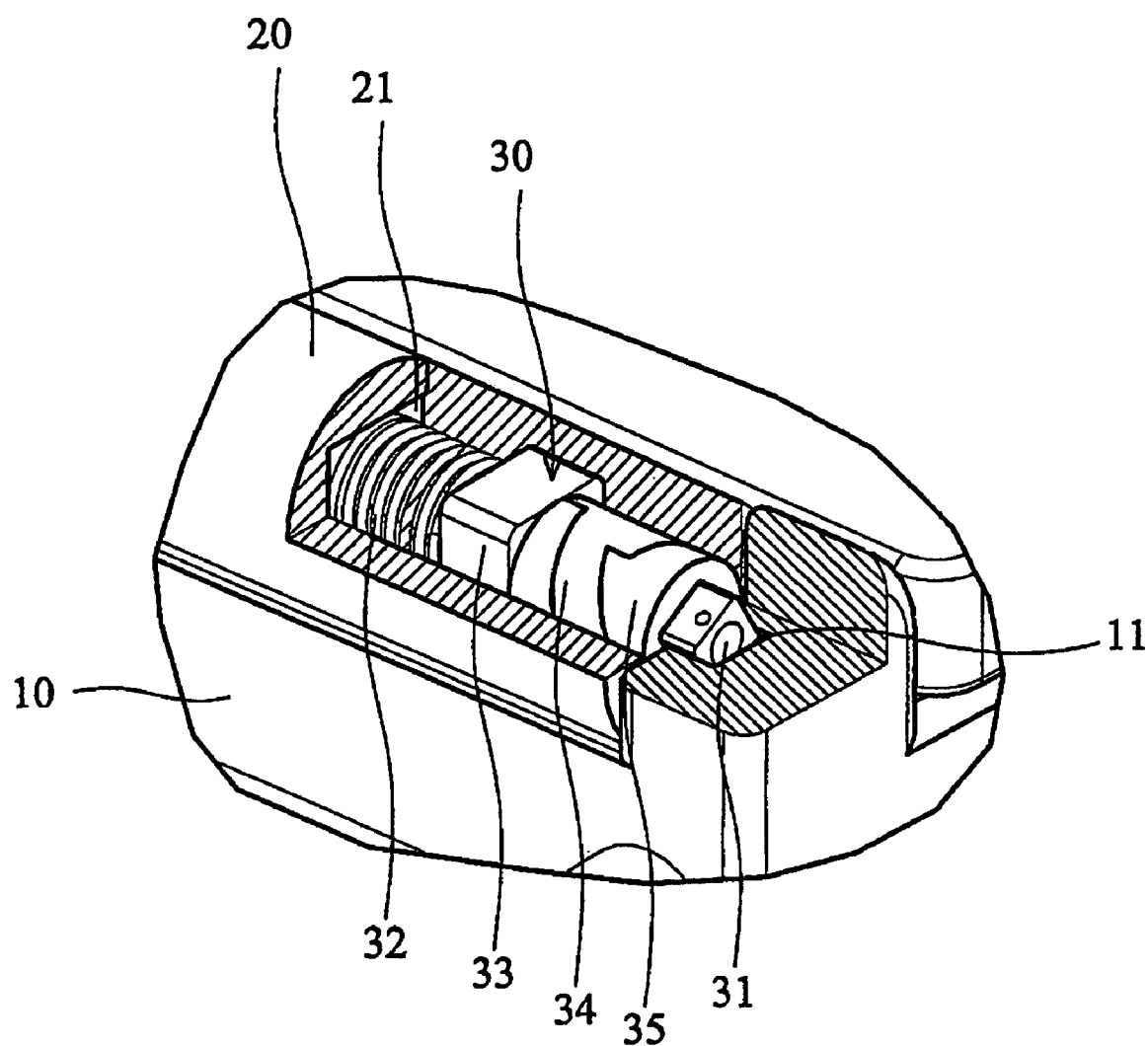
FIG. 1c is an enlarged view of a portion A in FIG. 1b.

FIGS. 1a-1c show an electronic device as disclosed in a first embodiment of the invention. The electronic device 1 includes a body 10, an upper housing portion 20, and a hinge assembly 30. The body 10 is the main component of the electronic device 1, and includes a printed circuit board (not shown) therein and a keypad (not labeled) thereon. As shown in FIG. 1c, the body 10 includes a first fixed hole 11 in which the hinge assembly 30 is disposed. The upper housing portion 20 is disposed on the body 10 in a manner such that the upper housing portion 20 can rotate in an opening direction (hereinafter referred as a first direction) and a closing direction (hereinafter referred as a second direction) as shown in FIG. 1a. The second direction is opposite to the first direction. In addition, the upper housing portion 20 may include a screen (not labeled) thereon. As shown in FIG. 1c, the upper housing portion 20 includes a second fixed hole 21 in which the hinge assembly 30 is disposed.

Figure 2A:
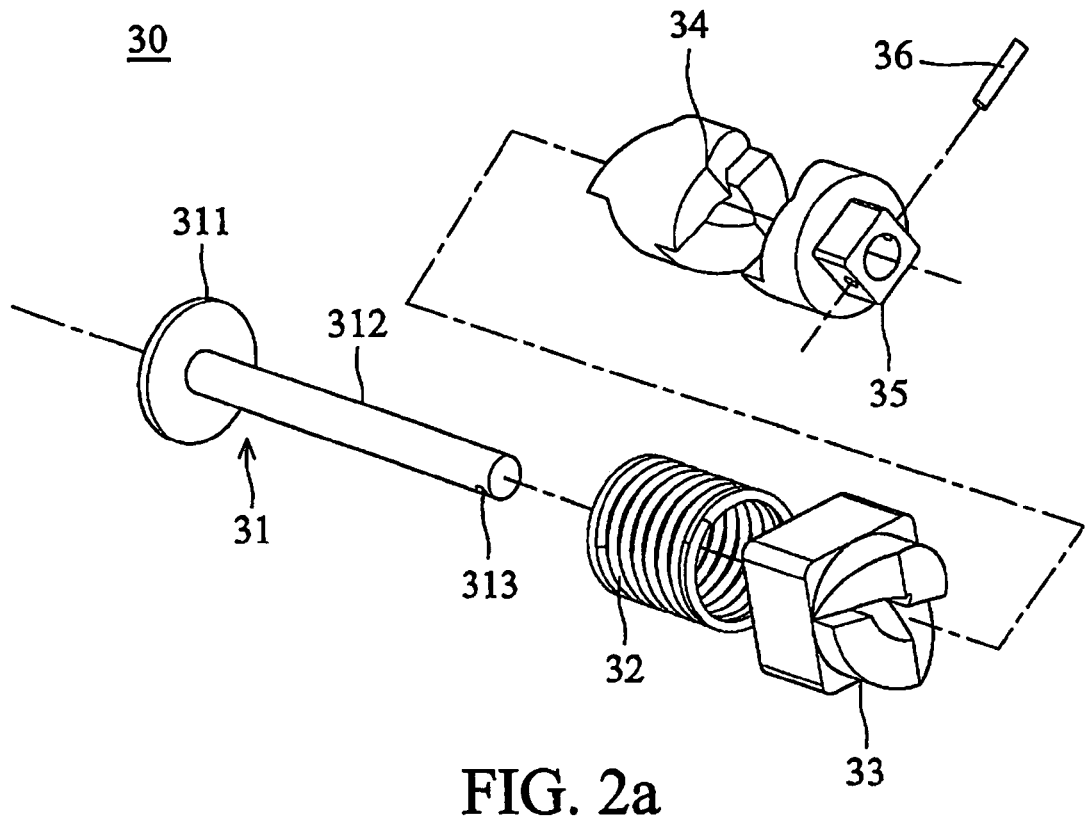
FIG. 2a is an exploded view of a hinge assembly as disclosed in the invention.
Figure 2B:
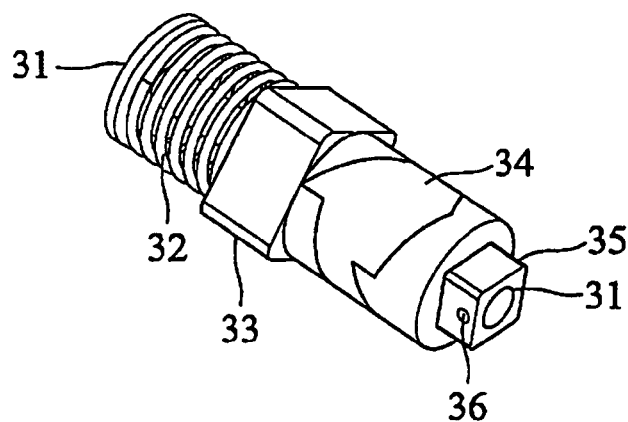

As shown in FIG. 1b and FIG. 1c, the hinge assembly 30 is disposed in the first fixed hole 11 of the body 10 and the second fixed hole 21 of the upper housing portion 20, and connects the upper housing portion 20 to the body 10 so that the upper housing portion 20 can rotate with respect to the body 10. Referring to FIG. 2a and FIG. 2b, the hinge assembly 30 includes a base 31, an elastic member 32, a first cam 33, a second cam 34, a third cam 35, and a pin 36.

As shown in FIG. 1c, the base 31 is disposed in the first fixed hole 11 and the second fixed hole 21. As shown in FIG. 2a, the base 31 includes a bottom portion 311 and a shaft portion 312. The bottom portion 311 is located in the second fixed hole 21 of the upper housing portion 20, and the elastic member 32 is disposed on the bottom portion 311. The shaft portion 312 is integrally formed with the bottom portion 311 and normal to the bottom portion 311, and passes through the elastic member 32, the first cam 33, the second cam 34, and the third cam 35. The shaft portion 312 includes a fourth through hole 313.

The elastic member 32 is disposed on the bottom portion 311 of the base 31, and is located in the second fixed hole 21 of the upper housing portion 20. When the first cam 33, the second cam 34, and third cam 35 rotate, their movement is restricted to a predetermined range due to the elastic member 32. It is understood that the elastic member 32 may a spring.

Figure 3A:
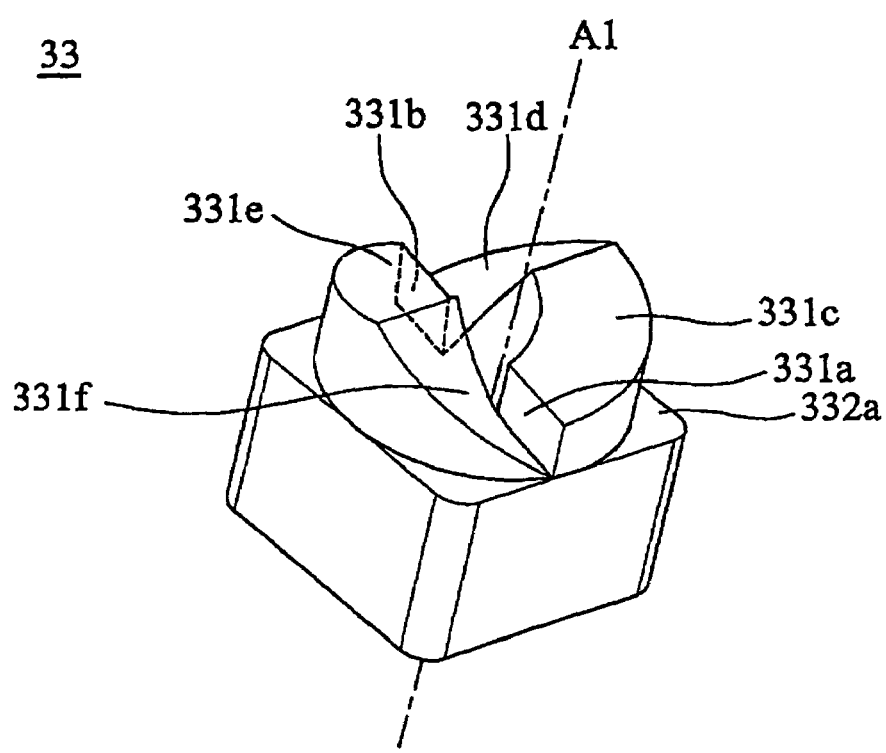
Figure 3B:
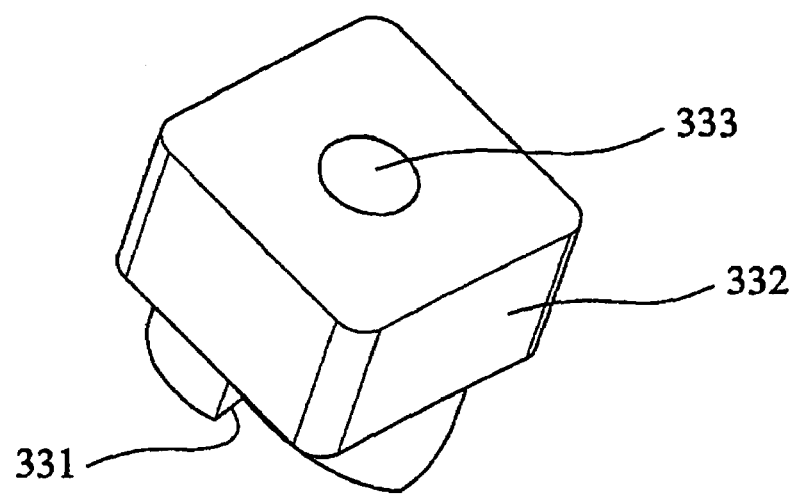

The first cam 33 is disposed on the base 31 in a manner such that the first cam 33 is abutted by the elastic member 32. As shown in FIG. 1c, the first cam 33 is located in the second fixed hole 21 of the upper housing portion 20. Referring to FIG. 3a and FIG. 3b, the first cam 33 includes a first curved surface 331 at a side abutted by the second cam 34, and includes a first fixed coupler 332 opposite to the first curved surface 331. The first curved surface 331 includes a first portion 331a, a second portion 331b, a fifth portion 331c, a sixth portion 331d, a seventh portion 331e, and an eighth portion 331f. Both the first portion 331a and the second portion 331b have substantially flat faces, and both the normal directions thereof are perpendicular to a central axis A1 of the first cam 33. The first portion 331a and the second portion 331b are conjugate to each other with respect to the central axis A1.

As shown in FIG. 3a, the fifth portion 331c, the sixth portion 331d, the seventh portion 331e, and the eighth portion 331f are inclined faces respectively. The fifth portion 331c is connected to the first portion 331a and the sixth portion 331d. The sixth portion 331d is connected to the second portion 331b and the fifth portion 331c. The seventh portion 331e is connected to the second portion 331b and the eighth portion 331f. The eighth portion 331f is connected to the first portion 331a and the seventh portion 331e. Furthermore, the fifth portion 331c and the seventh portion 331e are conjugate to each other with respect to the central axis A1. The sixth portion 331d and the eighth portion 331f are conjugate to each other with respect to the central axis A1.

Referring to FIG. 1c, the shape of the first coupler 332 corresponds to that of the second fixed hole 21. Thus, the first cam 33 can slide in the second fixed hole 21, but does not rotate with respect to the second fixed hole 21. That is, the first cam 33 can rotate along with the upper housing portion 20. In addition, as shown in FIG. 3b, the first cam 33 includes a first through hole 333, and is assembled with the base 31 by the shaft portion 312 of the base 31 passing through the first through hole 333 as shown in FIG. 2b.

Figure 3C:
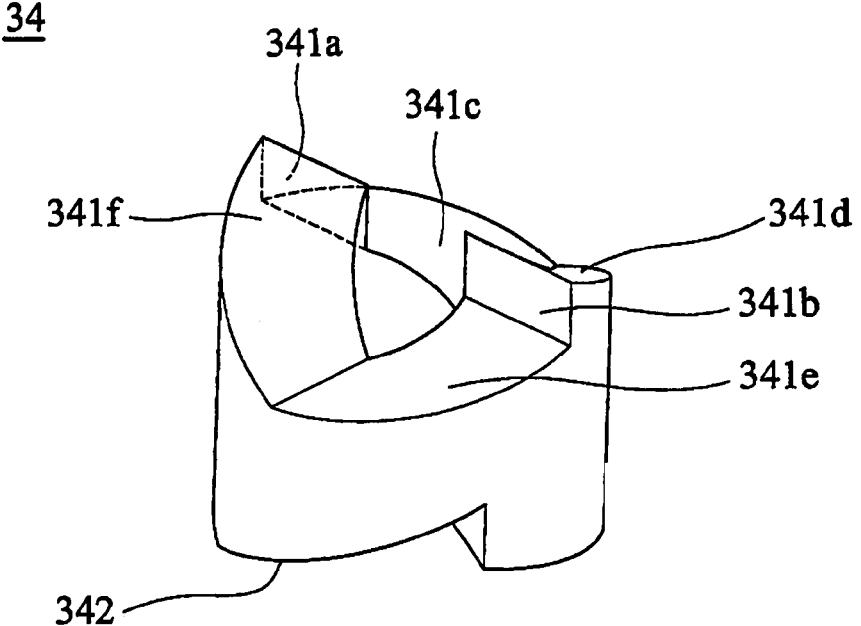
Figure 3D:
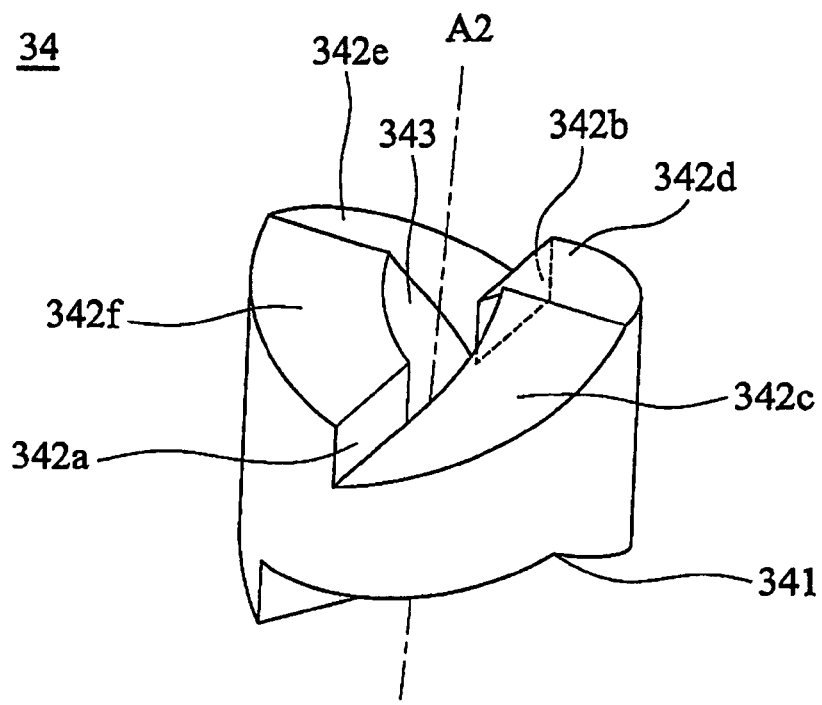

The second cam 34 is disposed on the base 31 in a manner such that the second cam 34 is abutted by the first cam 33. As shown in FIG. 1c, the second cam 34 is located in the second fixed hole 21 of the upper housing portion 20. Referring to FIG. 3c and FIG. 3d, the second cam 34 includes a second curved surface 341 at a side abutted by the first cam 33, and includes a third curved surface 342 at a side abutted by the third cam 35.

As shown in FIG. 3c, the second curved surface 341 includes a third portion 341a, a fourth portion 341b, a ninth portion 341c, a tenth portion 341d, an eleventh portion 341e, and a twelfth portion 341f. Both the third portion 341a and the fourth portion 341b have substantially flat faces, and both the normal directions thereof are perpendicular to a central axis A2 of the second cam 34. The third portion 341a and the fourth portion 341b are conjugate to each other with respect to the central axis A2. The first portion 331a and the second portion 331b of the first cam 33 are engaged with the third portion 341a and the fourth portion 341b of the second cam 34. When the first cam 33 is rotated to a second predetermined angle in the second direction by the upper housing portion 20 as shown in FIG. 4i, the first cam 33 can be rotated automatically to a first predetermined angle, as shown in FIG. 4j, by the first portion 331a, the second portion 331b, the third portion 341a, and the fourth portion 341b.

As shown in FIG. 3c, the ninth portion 341c, the tenth portion 341d, the eleventh portion 341e, and the twelfth portion 341f are inclined faces respectively. The ninth portion 341c is connected to the third portion 341a and the tenth portion 341d. The tenth portion 341d is connected to the fourth portion 341b and the ninth portion 341c. The eleventh portion 341e is connected to the fourth portion 341b and the twelfth portion 341f. The twelfth portion 341f is connected to the third portion 341a and the eleventh portion 341e. Furthermore, the ninth portion 341c and the eleventh portion 341e are conjugate to each other with respect to the central axis A2. The tenth portion 341d and the twelfth portion 341f are conjugate to each other with respect to the central axis A2.

In addition, the fifth portion 331c and the seventh portion 331e of the first cam 33 correspond to the ninth portion 341c and the eleventh portion 341e of the second cam 34. The sixth portion 331d and the eighth portion 331f of the first cam 33 correspond to the tenth portion 341d and the twelfth portion 341f of second cam 34.

As shown in FIG. 3d, the third curved surface 342 includes a thirteenth portion 342a, a fourteenth portion 342b, a seventeenth portion 342c, an eighteenth portion 342d, a nineteenth portion 342e, and a twentieth portion 342f. Both the thirteenth portion 342a and the fourteenth portion 342b have substantially flat faces, and both the normal directions thereof are perpendicular to the central axis A2. The thirteenth portion 342a and the fourteenth portion 342b are conjugate to each other with respect to the central axis A2.

The seventeenth portion 342c, the eighteenth portion 342d, the nineteenth portion 342e, and the twentieth portion 342f are inclined faces respectively. The seventeenth portion 342c is connected to the thirteenth portion 342a and the eighteenth portion 342d. The eighteenth portion 342d is connected to the fourteenth portion 342b and the seventeenth portion 342c. The nineteenth portion 342e is connected to the fourteenth portion 342b and the twentieth portion 342f. The twentieth portion 342f is connected to the thirteenth portion 342a and the nineteenth portion 342e. The seventeenth portion 342c and the nineteenth portion 342e are conjugate to each other with respect to the central axis A2, and the eighteenth portion 342d and the twentieth portion 342f are conjugate to each other with respect to the central axis A2.

In addition, when the upper housing portion 20 is rotated in the first direction, the second cam 34 is rotated by the upper housing portion 20 via the first cam 33. In addition, as shown in FIG. 3c, the second cam 34 includes a second through hole 343, and is assembled with the base 31 by the shaft portion 312 of the base 31 passing through the second through hole 343.

Figure 3E:
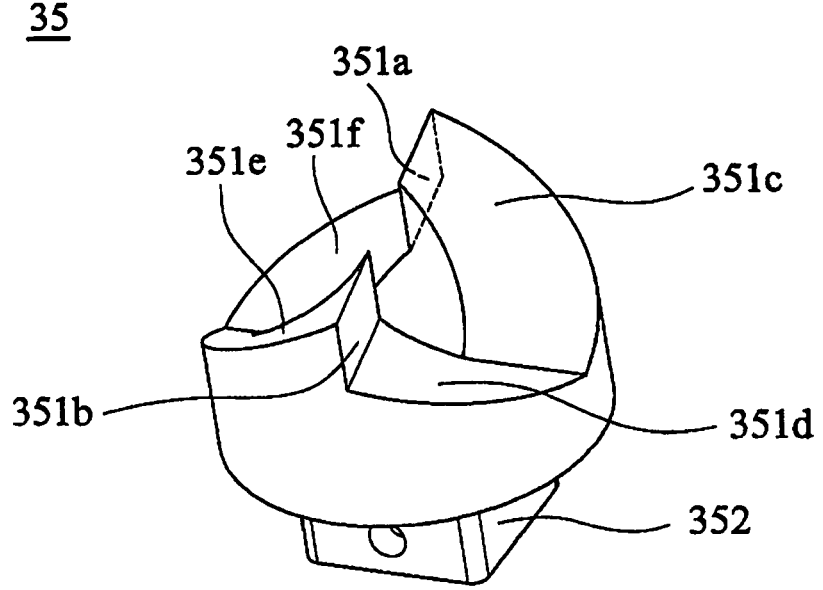
Figure 3F:
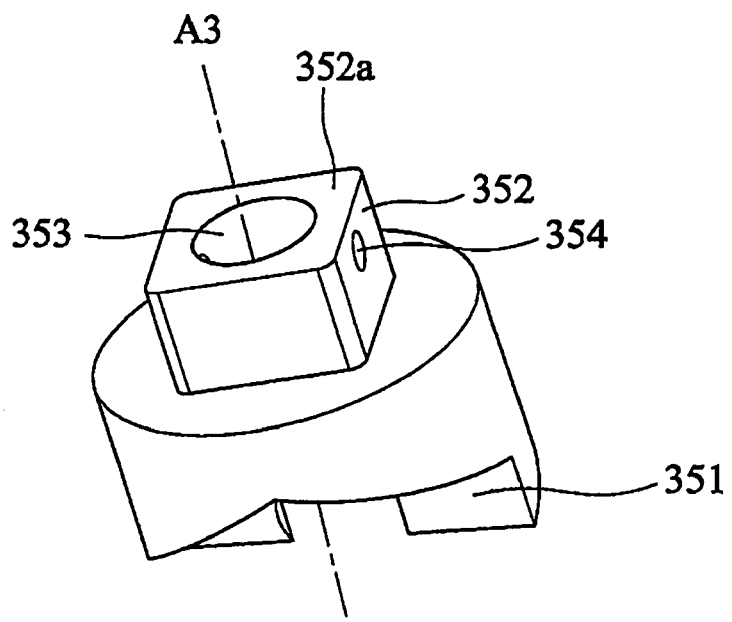

Referring to FIG. 1c, the third cam 35 is disposed on the base 31 in a manner such that the third cam 35 is abutted by the second cam 34. A portion of the second cam 34 is located in the first fixed hole 11, and another portion of that is located in the second fixed hole 21. Furthermore, as shown in FIG. 3e and FIG. 3f, the third cam 35 includes a fourth curved surface 351 at a side abutted by the second cam 34, and includes a second fixed coupler 352 opposite to the fourth curved surface 351. The fourth curved surface 351 includes a fifteenth portion 351a, a sixteenth portion 351b, a twenty-first portion 351c, a twenty-second portion 351d, a twenty-third portion 351e, and a twenty-fourth portion 351f. Both the fifteenth portion 351a and the sixteenth portion 351b have substantially flat faces, and both the normal directions thereof are perpendicular to a central axis A3 of the third cam 35. The fifteenth portion 351a and the sixteenth portion 351b are conjugate to each other with respect to the central axis A3.

The thirteenth portion 342a and the fourteenth portion 342b of the second cam 34 are engaged with the fifteenth portion 351a and the sixteenth portion 351b of the third cam 35. When the second cam 34 is rotated to a fourth predetermined angle in the first direction by the upper housing portion 20 via the first cam 33 as shown in FIG. 4c, the second cam 34 can be automatically rotated to a third predetermined angle, as shown in FIG. 4f, by the thirteenth portion 342a, the fourteenth portion 342b, the fifteen portion 351a, and the sixteenth portion 351b.

As shown in FIG. 3e, the twenty-first portion 351c, the twenty-second portion 351d, the twenty-third portion 351e, and the twenty-fourth portion 351f are inclined faces respectively. The twenty-first portion 351c is connected to the fifteenth portion 351a and the twenty-second portion 351d. The twenty-second portion 351d is connected to the sixteenth portion 351b and the twenty-first portion 351c. The twenty-third portion 351e is connected to the sixteenth portion 351b and the twenty-fourth portion 351f. The twenty-fourth portion 351f is connected to the fifteenth portion 351a and the twenty-third portion 351e. The twenty-first portion 351c and the twenty-third portion 351e are conjugate to each other with respect to the central axis A3, and the twenty-second portion 351d and the twenty-fourth portion 351f are conjugate to each other with respect to the central axis A3.

The seventeenth portion 342c and the nineteenth portion 342e of the second cam 34 correspond to the twenty-first portion 351c and the twenty-third portion 351e of the third cam 35. The eighteenth portion 342d and the twentieth portion 342f of the second cam 34 correspond to the twenty-second portion 351d and the twenty-fourth portion 351f of the third cam 35.

Referring to FIG. 1c, the shape of the second fixed coupler 352 corresponds to that of the first fixed hole 11 so that the third cam does not rotate with respect to the first fixed hole 11 of the body 10. Thus, when the upper housing portion 20 is rotated in the second direction, the second cam 34 is blocked by the third cam 35 so that the second cam 34 does not rotate with the upper housing portion 20. In addition, as shown in FIG. 3e, the third cam 35 includes a third through hole 353, and is assembled with the base 31 by the shaft portion 312 of the base 31 passing through the third through hole 353.

As shown in FIG. 3f, the third cam 35 includes a fifth through hole 354, corresponding to the fourth through hole 313 of the shaft portion 312, in which the pin 36 passes through. That is, the pin 36 passes through the fifth through hole 354 and the fourth through hole 313 so that the third cam 35 is fixed on the base 31. As a result, the elastic member 32, the first cam 33, and the second cam 34 are positioned between the base 31 and the third cam 35 as shown in FIG. 2b and FIG. 4a.

Figure 4A:
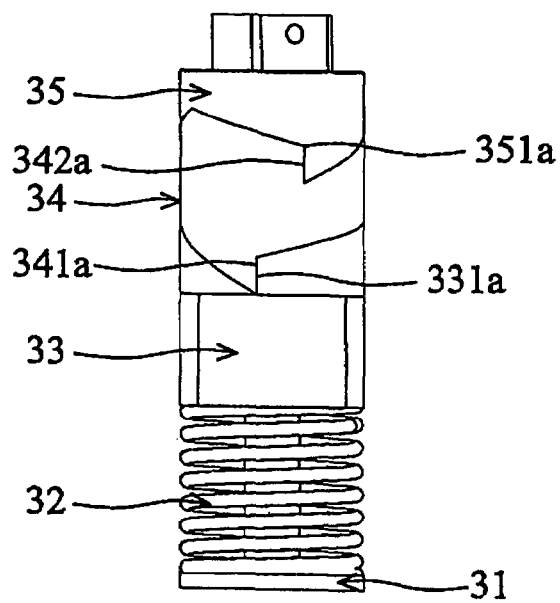
FIGS. 4a-4j are schematic views showing the hinge assembly in different rotating angles.
Figure 4B:
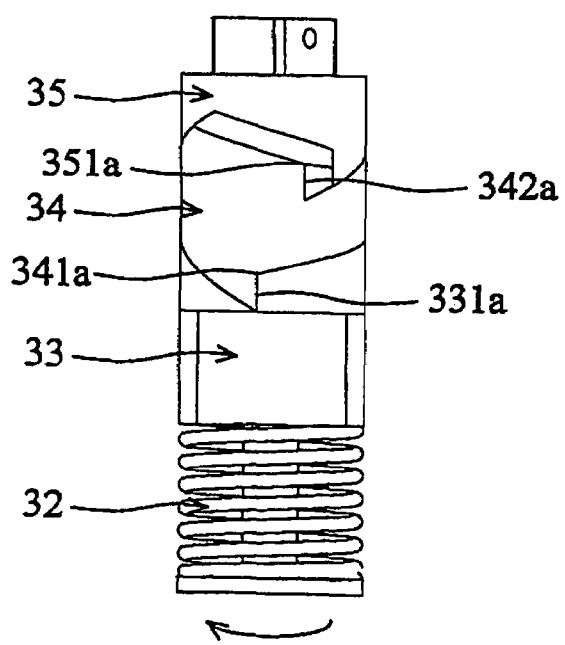
Figure 4C:
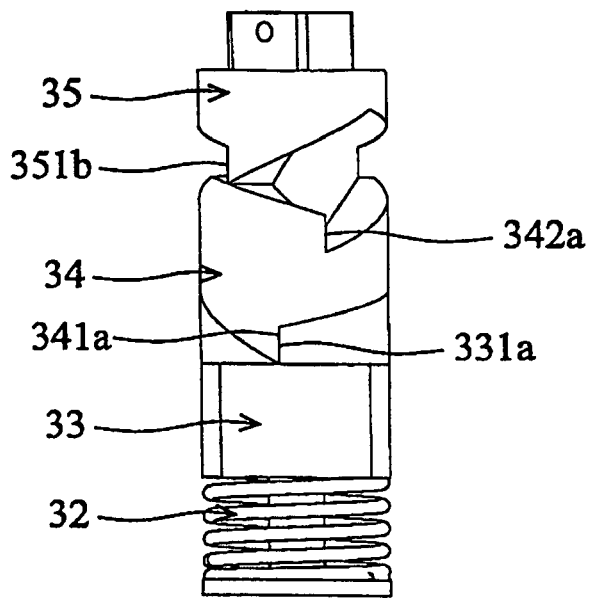
Figure 4D:
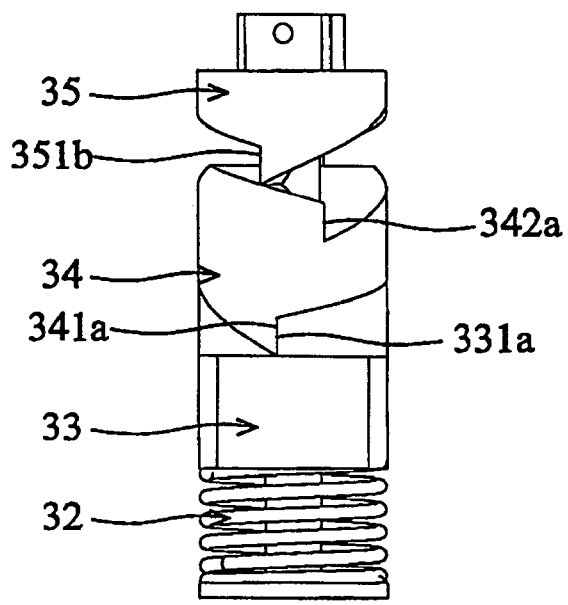
Figure 4E:
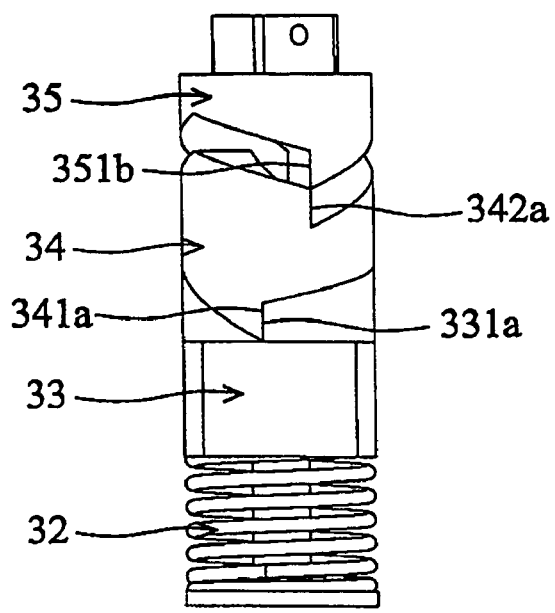
Figure 4F:
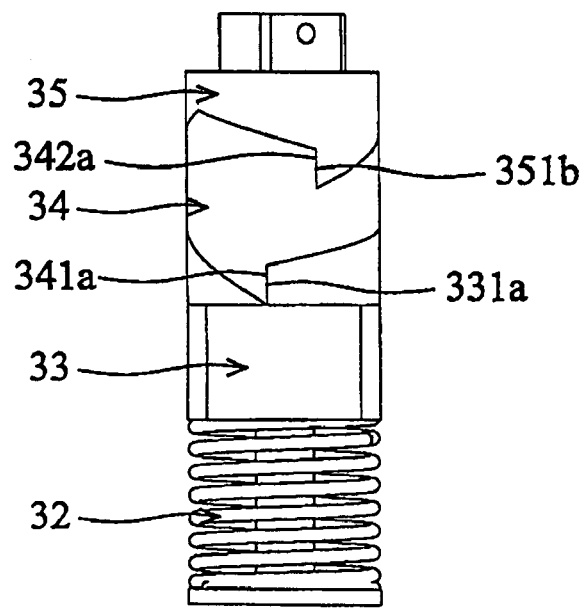
Figure 4G:
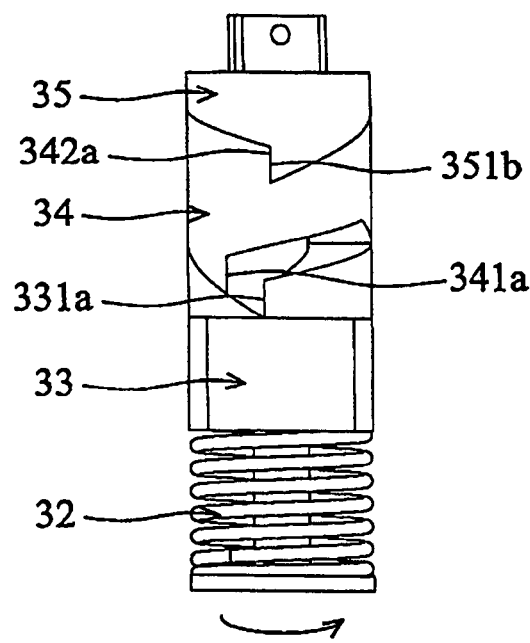
Figure 4H:
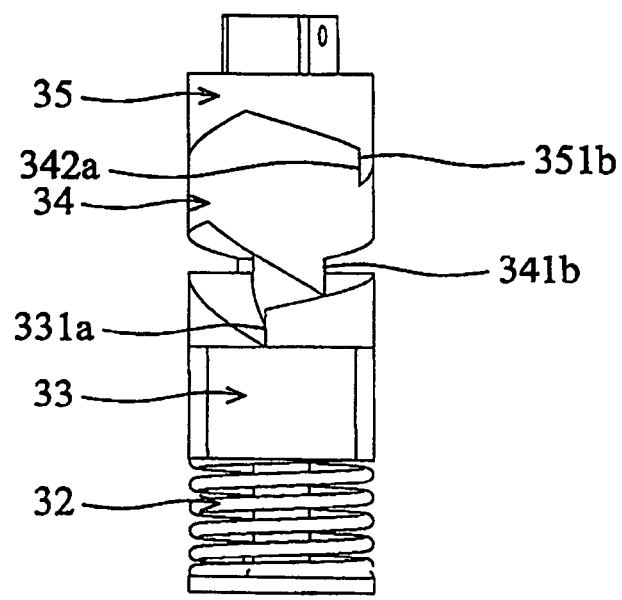
Figure 4I:
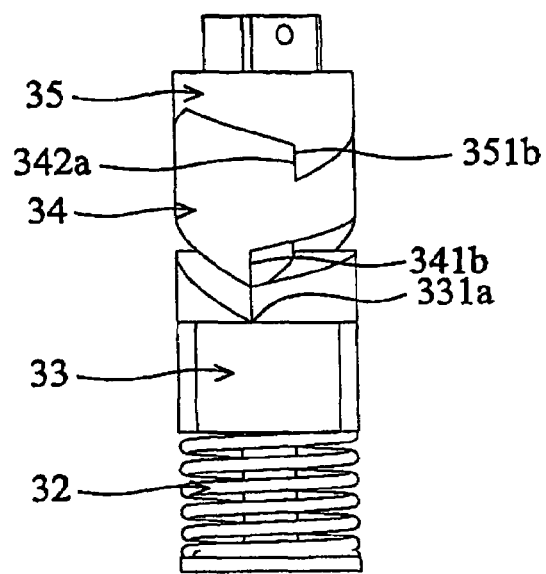
Figure 4J:
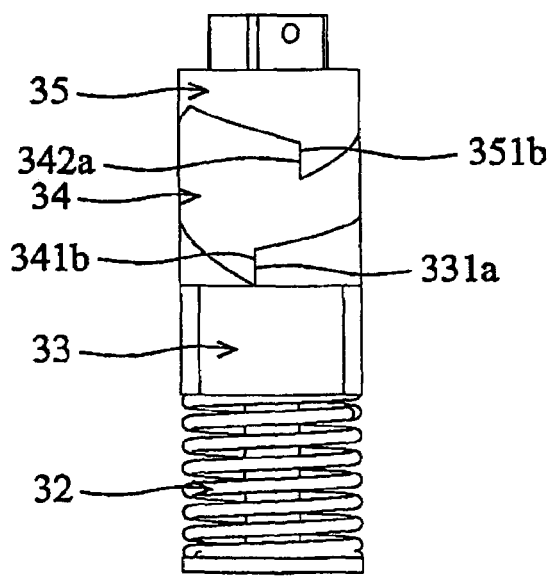
Figure 5:
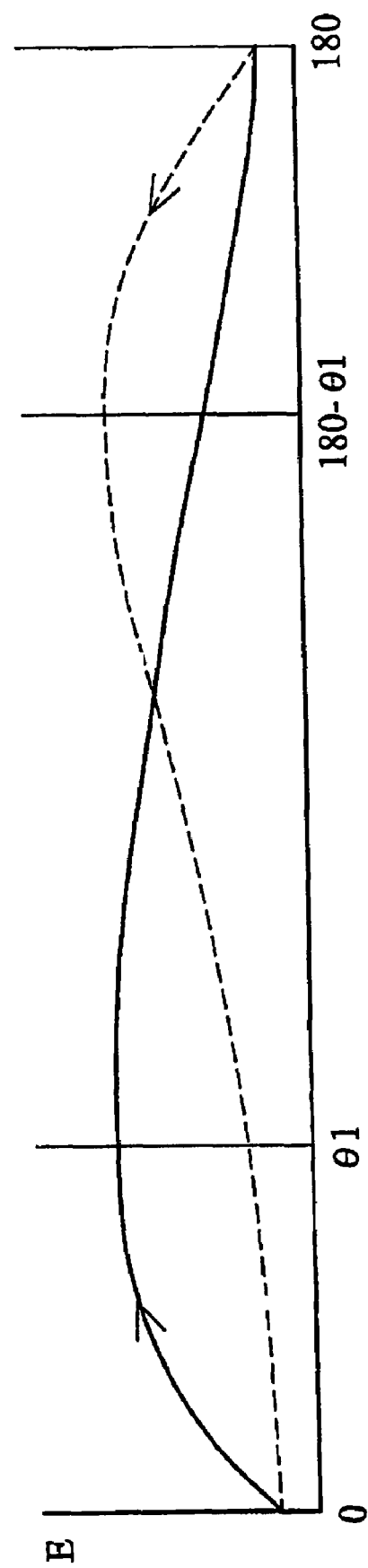
FIG. 5 is a schematic view in the potential energy of an elastic member when an upper housing portion is rotated.

FIGS. 4a-4j are schematic views showing the hinge assembly 30 at different angles of rotation, and FIG. 5 is a schematic view of a change in the potential energy of the elastic member 32 when the upper housing portion 20 is rotated. In FIG. 5, a horizontal axis represents an angle between the body 10 and the upper housing portion 20, and a vertical axis represents the potential energy of the elastic member 32. Also, in FIG. 5, a solid line represents the change in the potential energy of the elastic member 32 when the upper housing portion 20 is opened, and the dashed line represents the change in the potential energy of the elastic member 32 when the upper housing portion 20 is closed.

FIG. 4a shows the hinge assembly 30 in an initial state. In FIG. 4a, the fifteenth portion 351a of the third cam 35 is engaged with the thirteenth portion 342a of the second cam 34, and the third portion 341a of the second cam 34 is engaged with the first portion 331a of the first cam 33. It is noted that the potential energy of the elastic member 32 in FIG. 4a is shown at a "0" position on the horizontal axis of FIG. 5. To open the upper housing portion 20, the first cam 33 is rotated in a clockwise direction (i.e. first direction) with respect to the third cam 35 as shown in FIGS. 4b-4f. Since the third portion 341a of the second cam 34 is engaged with the first portion 331a of the first cam 33, the first cam 33 does not rotate with respect to the second cam 34. Thus, when the first cam 33 is rotated in the first direction, the second cam 34 is simultaneously rotated along with the first cam 33. In addition, by the curved surfaces 342 and 351 between the second cam 34 and the third cam 35, the second cam 34 is rotated with respect to the third cam 35 so that the elastic member 32 is compressed by the first cam 33 and the second cam 34. Thus, the potential energy of the elastic member 32 is increased as shown in the solid line of FIG. 5. That is, when the first cam 33 is rotated in the first direction, the torsion potential between the first cam 33 and the third cam 35 is determined by the curved surfaces 342 and 351 between the second cam 34 and the third cam 35. When the relationship between the second cam 34 and the third cam 35 is located between the state of FIG. 4b and the state of FIG. 4c, the angle between the body 10 and the upper housing portion 20 is located at a "θ1" position on the horizontal axis of FIG. 5. At this time, the potential energy of the elastic member 32 attains its highest point along the solid line. The second cam 34 can then be engaged with the third cam 35 again by torsion from the elastic member 32 as shown in FIGS. 4d-4f. As a result, the angle between the body 10 and the upper housing portion 20 is located at 180 degrees.

In contrast, to return the upper housing portion 20 to a closed state, the first cam 33 is rotated in a counterclockwise direction (i.e. second direction) with respect to the third cam 35 as shown in FIGS. 4f-4i. Since the sixteenth portion 351b of the third cam 35 is engaged with the thirteenth portion 342a of the second cam 34, the second cam 34 does not rotate with respect to the third cam 35. Thus, when the first cam 33 is rotated in the second direction, the second cam 34 is blocked by the third cam 35 to prevent it from rotating with the first cam 33. In addition, by the curved surfaces 331 and 341 between the second cam 34 and the first cam 33, the second cam 34 is rotated with respect to the first cam 33 so that the elastic member 32 is compressed by the first cam 33. Thus, the potential energy of the elastic member 32 is changed as shown in the dash line of FIG. 5. That is, when the first cam 33 is rotated in the second direction, the torsional performance between the first cam 33 and the third cam 35 is determined by curved surfaces 331 and 341 between the second cam 34 and the first cam 33. When the relationship between the first cam 33 and the second cam 34 is located in the state between FIG. 4g and FIG. 4h, the angle between the body 10 and the upper housing portion 20 is located at a "180-θ1" position on the horizontal axis of FIG. 5. At this time, the potential energy of the elastic member 32 attains its highest point along the dashed line. The second cam 34 can then be engaged with the first cam 33 again by the torsion of the elastic member 32 as shown in FIG. 4j. As a result, the angle between the body 10 and the upper housing portion 20 is located at 0 degrees.

It is noted that FIGS. 4a-4j are illustrated by using the first cam 33 as a focal component. That is, in FIGS. 4a-4j, the first cam 33 is maintained at a fixed position, and the second cam 34 and the third cam 35 are rotated.

As stated above, when the upper housing portion 20 is opened, the torsion required between the upper housing portion 20 and the body 10 is determined by the curved surfaces 342 and 351 between the second cam 34 and the third cam 35. When the upper housing portion 20 is closed, the amount of torsion between the upper housing portion 20 and the body 10 is determined by curved surfaces 331 and 341 between the first cam 33 and the second cam 34.

That is, in the hinge assembly of this embodiment, the curved surfaces between the first cam and second cam are different from those between the second cam and the third cam. Thus, the critical torsion points (i.e. points where the automatic opening and closing features are engaged) are different when the upper housing portion is opened and closed. As a result, the automatic opening and closing features of the electronic device can be engaged from different angles on the hinge.

EMBODIMENT 2

Figure 6A:
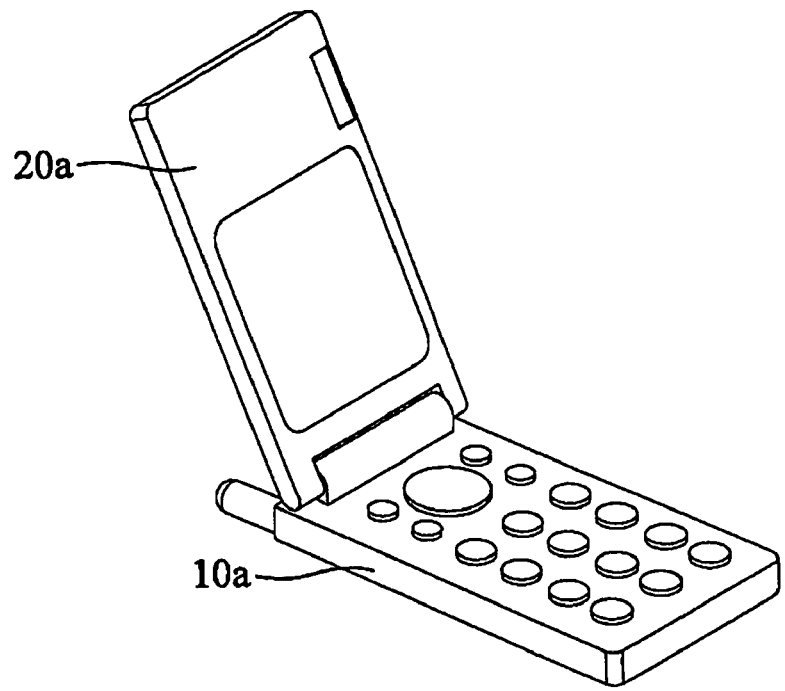
FIGS. 6a-6c are schematic views of an electronic device as disclosed in a second embodiment of the invention.
Figure 6B:
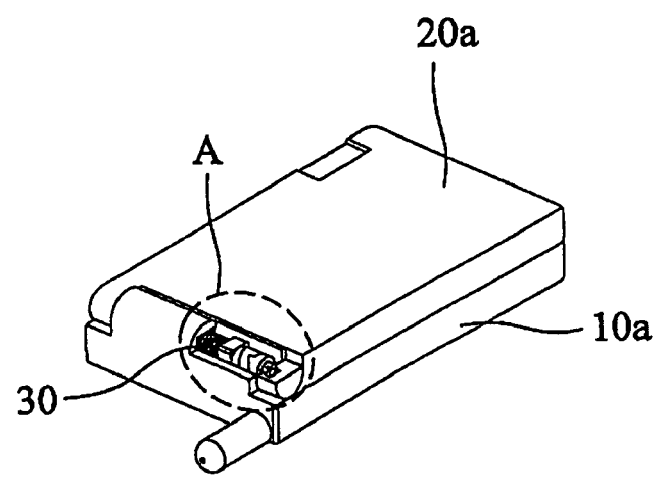
Figure 6C:
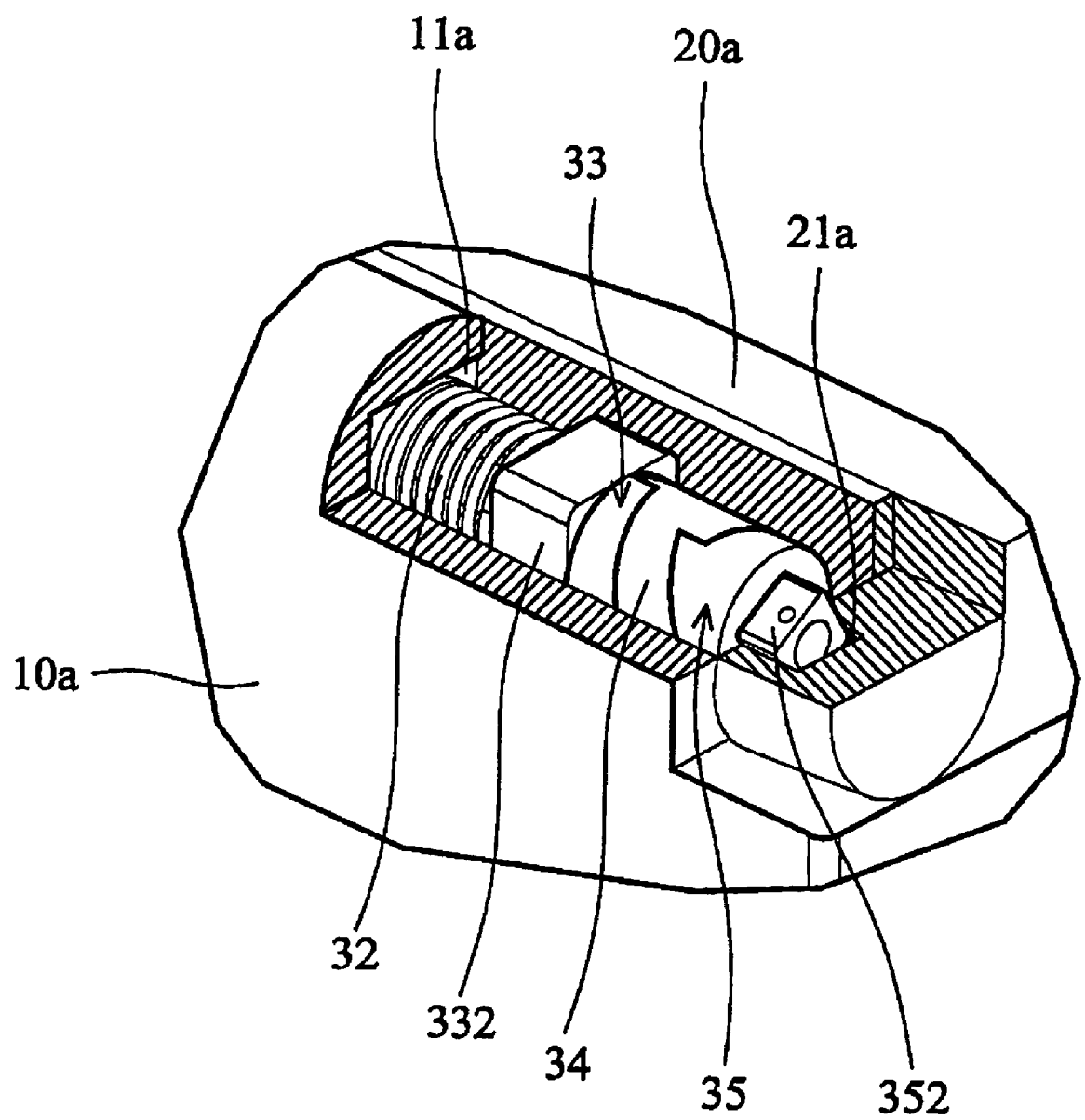

FIGS. 6a-6c show an electronic device 1a as disclosed in a second embodiment of this invention. The electronic device 1a includes a body 10a, an upper housing portion 20a, and a hinge assembly 30. The body 10a is the main component of the electronic device 1a, and includes a printed circuit board (not shown) therein and a keypad (not labeled) thereon. As shown in FIG. 6c, the body 10a includes a first fixed hole 11a in which the hinge assembly 30 is disposed. The upper housing portion 20a is disposed on the body 10a, and includes a screen (not labeled) thereon. As shown in FIG. 6c, the upper housing portion 20a includes a second fixed hole 21a in which the hinge assembly 30 is disposed. It is noted that the hinge assembly 30 of this embodiment is the same as that of the first embodiment. Thus, its description is omitted.

The difference between the first embodiment and this embodiment is described as follows. In this embodiment, the elastic member 32, the first cam 33, and the second cam 34 of the hinge assembly 30 are located in the first fixed hole 11a of the body 10a as shown in FIG. 6b and FIG. 6c. In addition, a portion of the third cam 35 is located in the first fixed hole 11a of the body 10a, and another portion of the third cam 35 is located in the second fixed hole 21a of the upper housing portion 20. That is, the shape of the first fixed coupler 332 of the first cam 33 corresponds to that of the first fixed hole 11a so that the first cam 33 does not rotate with respect to the first fixed hole 11a of the body 10a. The shape of the second fixed coupler 352 of the third cam 35 corresponds to that of the second fixed hole 21a so that the third cam 35 does not rotate with respect to the second fixed hole 21a of the upper housing portion 20a.

Thus, unlike the first embodiment, when the upper housing portion 20a is rotated with respect to the body 10a, the third cam 35 is rotated with respect to the first cam 33 by the upper housing portion 20a.

Since the hinge assembly of this embodiment is the same as that of the first embodiment, the functions of the first embodiment can also be attained in this embodiment. That is, the electronic device can be opened and closed from different angles.

While the invention has been described by way of example and in terms of the preferred embodiments, it is to be understood that the invention is not limited to the disclosed embodiments. To the contrary, it is intended to upper housing portion various modifications and similar arrangements (as would be apparent to those skilled in the art). Therefore, the scope of the appended claims should be accorded the broadest interpretation so as to encompass all such modifications and similar arrangements.

What is claimed is:

1. A hinge assembly comprising:
a base;
an elastic member disposed on the base;
a first cam disposed on the base in a manner such that the first cam rotates in a first direction and a second direction opposite to the first direction;
a second cam disposed on the base in a manner such that the second cam is abutted by the first cam, wherein the first cam and the second cam are arranged such that the first cam and the second cam are engaged and the second cam rotates along with the first cam when the first cam rotates in the first direction; and
a third cam disposed on the base in a manner such that the third cam is abutted by the second cam and the elastic member, wherein the second cam and the third cam are arranged such the second cam and the third cam are engaged and the second cam is blocked by the third cam and does not rotate along with the first cam when the first cam rotates in the second direction, and the third cam does not rotate along with the second cam when the first cam rotates in the first direction.

2. The hinge assembly as claimed in claim 1, wherein the first cam includes a first curved surface at a side abutted by the second cam, and the first curved surface includes a first portion and a second portion parallel to the first portion, and the second cam includes a second curved surface at a side abutted by the first cam, and the second curved surface includes a third portion and a fourth portion parallel to the third portion, and the first portion and the second portion are engaged with the third portion and the fourth portion, and the first cam automatically rotates to a first predetermined angle by the first portion, the second portion, the third portion, and the fourth portion when the first cam rotates to a second predetermined angle in the second direction due to external force.

3. The hinge assembly as claimed in claim 2, wherein the first curved surface further includes a fifth portion, a sixth portion, a seventh portion, and an eighth portion, and the fifth portion is connected to the first portion, and the sixth portion is connected to the second portion and the fifth portion, and the seventh portion is connected to the second portion, and the eighth portion is connected to the first portion and the seventh portion, and the fifth portion and the seventh portion are conjugate to each other with respect to a central axis of the first cam, and the sixth portion and the eighth portion are conjugate to each other with respect to the central axis of the first cam.

4. The hinge assembly as claimed in claim 3, wherein the second curved surface further includes a ninth portion, a tenth portion, an eleventh portion, and a twelfth portion, and the ninth portion is connected to the third portion, and the tenth portion is connected to the fourth portion and the ninth portion, and the eleventh portion is connected to the fourth portion, and the twelfth portion is connected to the third portion and the eleventh portion, and the ninth portion and the eleventh portion are conjugate to each other with respect to a central axis of the second cam, and the tenth portion and the twelfth portion are conjugate to each other with respect to the central axis of the second cam.

5. The hinge assembly as claimed in claim 4, wherein the fifth portion and the seventh portion correspond to the ninth portion and the eleventh portion, and the sixth portion and the eighth portion correspond to the tenth portion and the twelfth portion.

6. The hinge assembly as claimed in claim 2, wherein the first cam further includes a first fixed coupler opposite to the first curved surface.

7. The hinge assembly as claimed in claim 1, wherein the second cam includes a third curved surface at a side abutted by the third cam, and the third curved surface includes a thirteenth portion and a fourteenth portion parallel to the thirteenth portion, and the third cam includes a fourth curved surface at a side abutted by the second cam, and the fourth curved surface includes a fifteenth portion and a sixteenth portion parallel to the fifteenth portion, and the thirteenth portion and the fourteenth portion are engaged with the fifteenth portion and the sixteenth portion, and the first cam and the second cam automatically rotate to a third predetermined angle by the thirteenth portion, the fourteenth portion, the fifteenth portion, and the sixteenth portion when the second cam rotates to a fourth predetermined angle in the first direction by the first cam due to external force.

8. The hinge assembly as claimed in claim 7, wherein the third curved surface further includes a seventeenth portion, an eighteenth portion, a nineteenth portion, and a twentieth portion, and the seventeenth portion is connected to the thirteenth portion, and the eighteenth portion is connected to the fourteenth portion and the seventeenth portion, and the nineteenth portion is connected to the fourteenth portion, and the twentieth portion is connected to the thirteenth portion and the nineteenth portion, and the seventeenth portion and the nineteenth portion are conjugate to each other with respect to a central axis of the second cam, and the eighteenth portion and the twentieth portion are conjugate to each other with respect to the central axis of the second cam.

9. The hinge assembly as claimed in claim 8, wherein the fourth curved surface further includes a twenty-first portion, a twenty-second portion, a twenty-third portion, and a twenty-fourth portion, and the twenty-first portion is connected to the fifteenth portion, and the twenty-second portion is connected to the sixteenth portion and the twenty-first portion, and the twenty-third portion is connected to the sixteenth portion, and the twenty-fourth portion is connected to the fifteenth portion and the twenty-third portion, and the twenty-first portion and the twenty-third portion are conjugate to each other with respect to a central axis of the third cam, and the twenty-second portion and the twenty-fourth portion are conjugate to each other with respect to the central axis of the third cam.

10. The hinge assembly as claimed in claim 9, wherein the seventeenth portion and the nineteenth portion correspond to the twenty-first portion and the twenty-third portion, and the eighteenth portion and the twentieth portion correspond to the twenty-second portion and the twenty-fourth portion.

11. The hinge assembly as claimed in claim 7, wherein the third cam further includes a second fixed coupler opposite to the fourth curved surface.

12. The hinge assembly as claimed in claim 1, wherein the base comprises:

a bottom portion on which the elastic member is disposed; and a shaft portion integrally formed with the bottom portion, for passing through the elastic member, the first cam, the second cam, and the third cam.

13. The hinge assembly as claimed in claim 12, wherein the first cam includes a first through hole, and the second cam includes a second through hole, and the third cam includes a third through hole, and the first cam, the second cam, and the third cam are disposed on the bottom portion by the shaft portion passing through the first through hole, the second through hole, and the third through hole.

14. The hinge assembly as claimed in claim 12, wherein the shaft portion includes a fourth through hole, and the first cam includes a fifth through hole corresponding to the fourth through hole, and the base further includes a pin for passing through the fifth hole and the fourth hole so that the first cam is fixed on the base.

15. The hinge assembly as claimed in claim 1, wherein the elastic member is a spring.

* * * * *